United States Patent
Tosini

(10) Patent No.: US 10,279,882 B2
(45) Date of Patent: May 7, 2019

(54) MEMBER TO CONTROL THE DIRECTION OF A VEHICLE, IN PARTICULAR A NAUTICAL VEHICLE

(71) Applicant: I.F.R.A. S.R.L., Occhiobello (RO) (IT)

(72) Inventor: Paolo Tosini, Ferrara (IT)

(73) Assignee: I.F.R.A. S.R.L., Occhiobello (RO) (IT)

( * ) Notice: Subject to any disclaimer, the term of this patent is extended or adjusted under 35 U.S.C. 154(b) by 64 days.

(21) Appl. No.: 15/514,695

(22) PCT Filed: Mar. 23, 2015

(86) PCT No.: PCT/IB2015/052111
§ 371 (c)(1),
(2) Date: Mar. 27, 2017

(87) PCT Pub. No.: WO2016/055871
PCT Pub. Date: Apr. 14, 2016

(65) Prior Publication Data
US 2017/0233050 A1    Aug. 17, 2017

(30) Foreign Application Priority Data
Sep. 30, 2014 (IT) .................................. BO20140081

(51) Int. Cl.
*B63H 25/02* (2006.01)
*B62D 1/04* (2006.01)
(Continued)

(52) U.S. Cl.
CPC ............ *B63H 25/02* (2013.01); *B62D 1/105* (2013.01); *F16H 1/10* (2013.01); *B63H 2025/022* (2013.01)

(58) Field of Classification Search
CPC .... B63H 25/02; B63H 2025/022; B62D 1/02; B62D 1/04; B62D 1/046; B62D 1/10; B62D 1/105; F16H 1/10; G05G 1/08
See application file for complete search history.

(56) References Cited

U.S. PATENT DOCUMENTS

| 3,059,496 A | 10/1962 | Jones |
| 3,543,874 A | 12/1970 | Nevett |

(Continued)

FOREIGN PATENT DOCUMENTS

| DE | 198 58 835 A1 | 6/2000 | |
| EP | 0825089 A1 * | 2/1998 | ............. B62D 1/105 |

(Continued)

OTHER PUBLICATIONS

Machine translation of EP 0825089 A1 obtained on Aug. 16, 2018.*
(Continued)

*Primary Examiner* — Adam D Rogers
(74) *Attorney, Agent, or Firm* — Young & Thompson

(57) ABSTRACT

A member (10) for controlling the direction of a vehicle, preferably in the form of a steering wheel for controlling the direction of a nautical vehicle, or boat, and includes a rotatable body (11), which can be manually operated by the skipper of the vehicle for controlling the direction of the vehicle and which is operatively connectable to unit defining, or determining, the direction of travel of the vehicle. The member includes a unit, or hub, (12) supporting the rotatable body, which include a component (14) fixed to the structure of the vehicle which rotatably support respective units (16) for supporting, or coupling, the rotatable body which can be operated manually, the unit fixed to the structure of the vehicle supporting corresponding unit (18) which can be used, in particular which can be operated and/or viewed, by the skipper, which remain fixed during the rotation of the rotatable body.

1 Claim, 12 Drawing Sheets

(51) Int. Cl.
B62D 1/10 (2006.01)
F16H 1/10 (2006.01)

(56) References Cited

U.S. PATENT DOCUMENTS

| | | | | |
|---|---|---|---|---|
| 4,602,523 A | * | 7/1986 | Kurata | B62D 1/105 200/61.54 |
| 6,893,044 B2 | * | 5/2005 | Holmes | B60R 21/2032 280/731 |
| 2002/0047255 A1 | * | 4/2002 | Baume | B60Q 1/0082 280/775 |

FOREIGN PATENT DOCUMENTS

| | | | | |
|---|---|---|---|---|
| EP | 1190934 A1 | * | 3/2002 | ............ B62D 1/105 |
| FR | 2 876 073 A1 | | 4/2006 | |
| FR | 2879990 A1 | * | 6/2006 | ............ B62D 1/105 |
| JP | S58 118455 A | | 7/1983 | |
| WO | 2007/080357 A1 | | 7/2007 | |

OTHER PUBLICATIONS

International Search Report, dated Jan. 21, 2016, from corresponding PCT application.
International Preliminary Report on Patentability , dated Jan. 12, 2017, from corresponding PCT application.

* cited by examiner

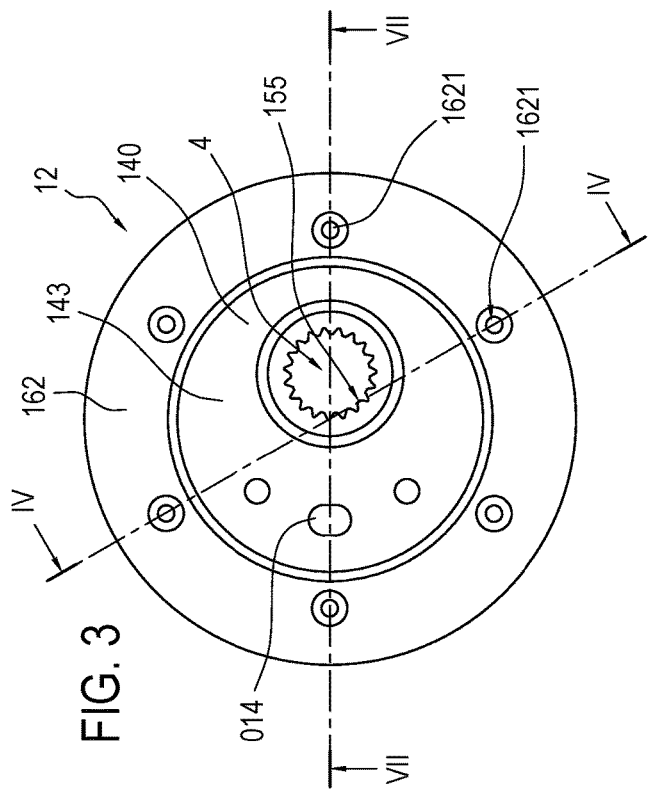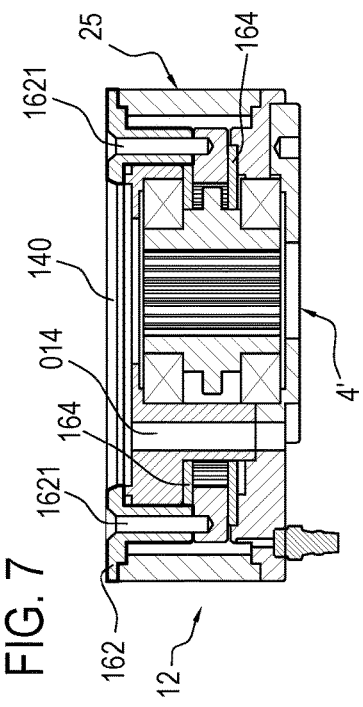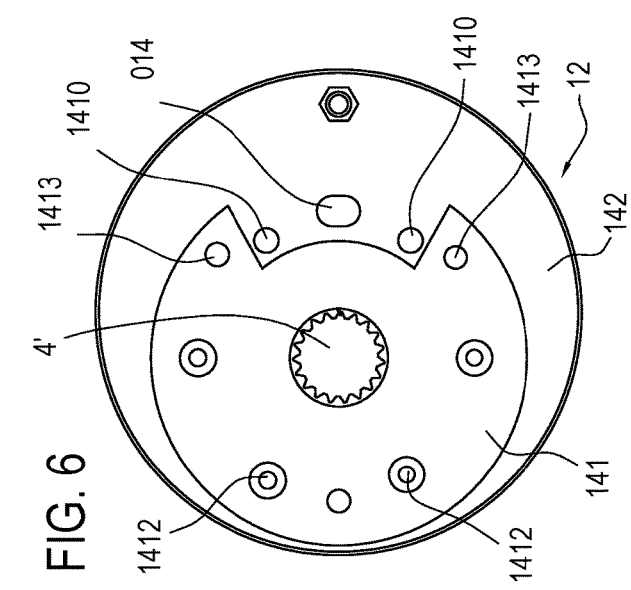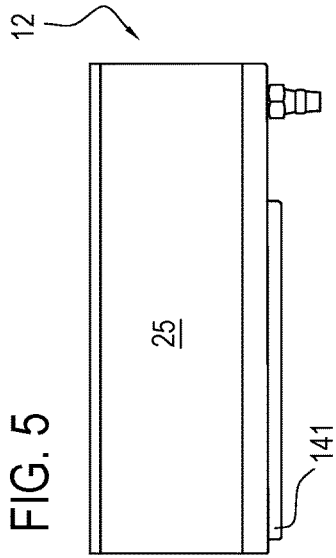

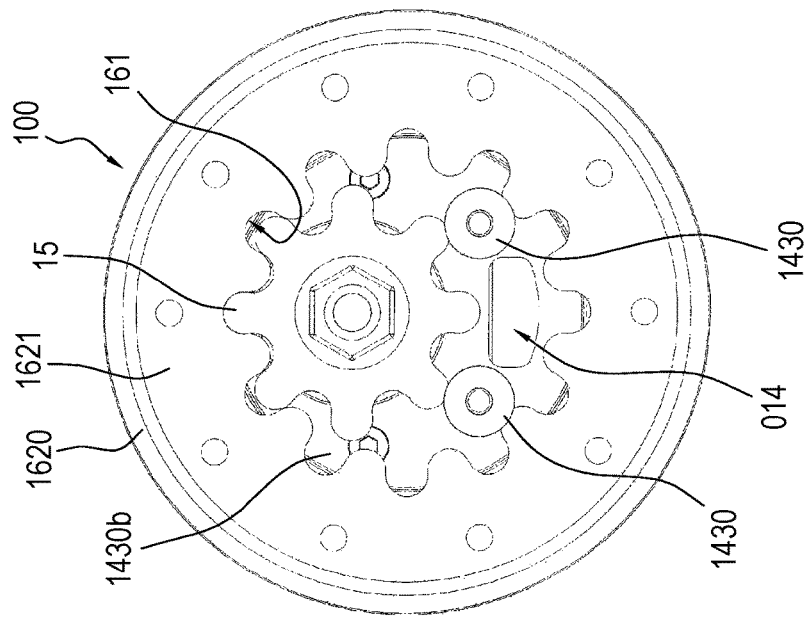
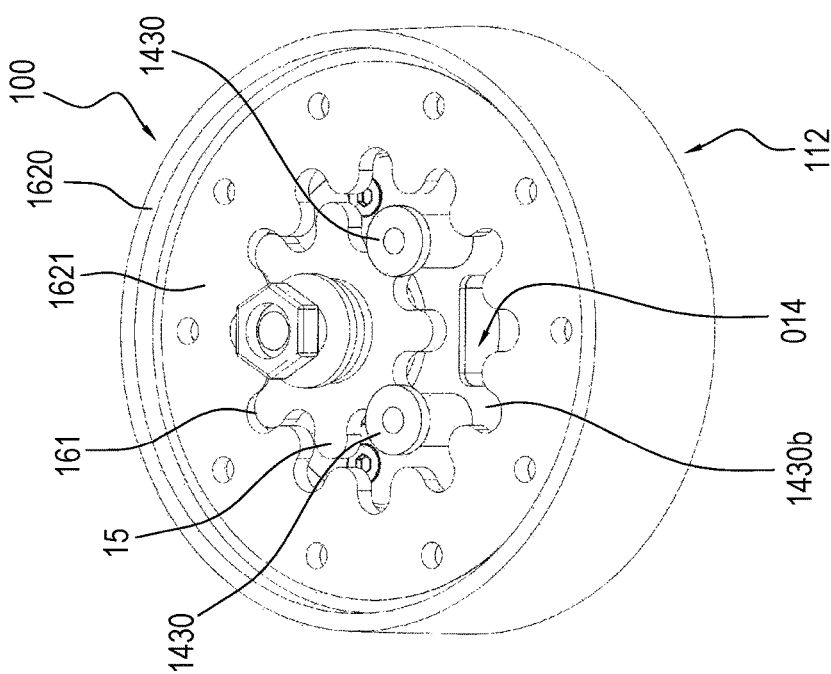

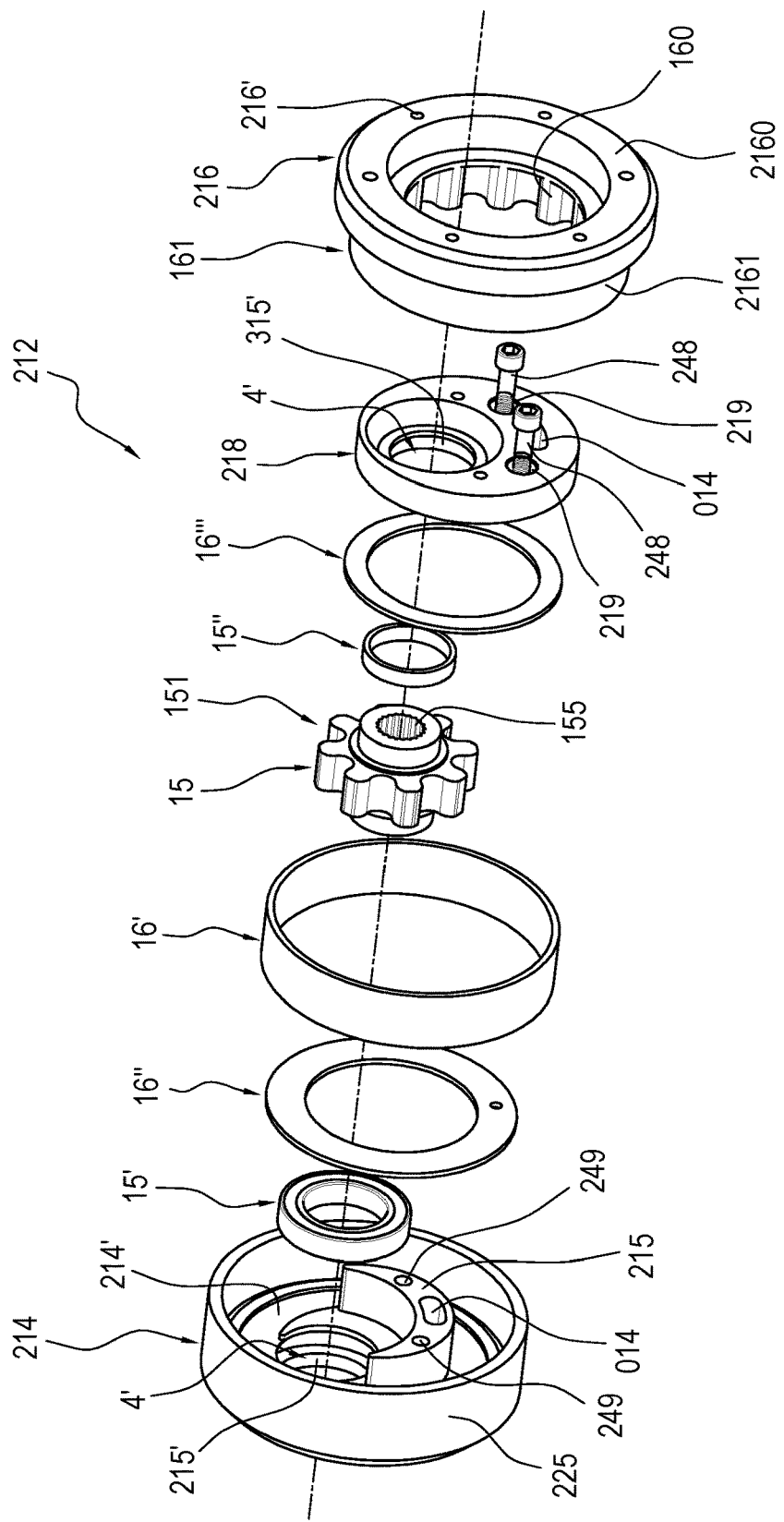

MEMBER TO CONTROL THE DIRECTION OF A VEHICLE, IN PARTICULAR A NAUTICAL VEHICLE

TECHNICAL FIELD

This invention relates to a member to control the direction of a vehicle, preferably to control the direction of a nautical vehicle.

BACKGROUND ART

There are prior art members preferably in the form of respective steering wheels to control the direction of a nautical vehicle, or boat, which comprise a respective rotatable body which can be manually operated by the skipper of the nautical vehicle to control the direction of the vehicle and is operatively connectable to means defining, or determining, the direction of travel of the vehicle.

As is known, the rotatable bodies, or steering wheels, for controlling the direction of the nautical vehicle are operated for modifying the direction of travel of the vehicle in such a way as to perform ample rotations, that is to say, even in such a way as to perform several complete revolutions.

As a result, a plurality of means, or components, which can be used by the skipper during the manoeuvre, for example elements, or pushbuttons, for controlling corresponding instruments, apparatuses and/or devices of the vehicle and/or of the control displays are positioned in a fixed manner on the dashboard of the nautical vehicle, and therefore in an inconvenient position to be viewed or to be reached and the skipper must therefore change his/her viewpoint and/or release the rotatable body to operate these, with a consequent high risk of performing incorrect manoeuvres.

In addition, the arrangement of the elements, or pushbuttons, for controlling corresponding instruments, apparatuses and/or devices of the vehicle, or respective control displays, on the dashboard of the nautical vehicle, makes it necessary to build boats which have large control dashboards, which cannot therefore be easily used for other functions, and, moreover, they must be provided with an extremely large number of cables for the respective connections, in particular defined by respective electrical cables.

In general, in particular in the nautical sector, the need is felt solutions which do not impact excessively on the appearance of the vehicle, in particular which occupy a limited space and which are quick and easy to set up.

SUMMARY OF THE INVENTION

This invention therefore proposes a new solution as an alternative to the solutions known up to now and, more specifically, proposes to overcome one or more of the above mentioned drawbacks and/or problems and/or to meet one or more of the needs felt in the trade or inferable from the above.

A member is therefore provided to control the direction of a vehicle, in particular a nautical vehicle, or boat, which has a respective rotatable body, or steering wheel, which can be manually operated by the skipper of the vehicle to control the direction of the vehicle and which is operatively connectable to means defining, or determining, the direction of travel of the vehicle; characterised in that it comprises means, or hub, for supporting the rotatable body which can be operated manually, which comprise means fixed to the structure of the vehicle and which rotatably support respective means for supporting, or coupling, the rotatable body which can be operated manually; and in that the means fixed to the structure of the vehicle support corresponding means which can be used, in particular which can be operated and/or viewed, by the skipper, which remain fixed during the rotations of the rotatable body.

In this way, it is possible for the skipper to have easy access, also visual, to the means which can be used, in particular which can be operated and/or viewed, by the skipper, during the steps of moving the vehicle, in particular of the nautical vehicle or boat, thus without the risk of performing incorrect manoeuvres.

BRIEF DESCRIPTION OF THE DRAWINGS

These and other innovative aspects are set out in the appended claims and the technical features and advantages are also apparent from the detailed description which follows of non-limiting example embodiments of it with reference to the accompanying drawings, in which:

FIG. 3 illustrates a plan view from above of the first preferred embodiment of the supporting hub;

FIG. 5 illustrates a side view of the first preferred embodiment of the hub;

FIG. 6 illustrates a plan view from below of the first preferred embodiment of the hub;

FIG. 7 illustrates a cross section of the first preferred embodiment of the hub through the line VII-VII of FIG. 3;

FIG. 11 illustrates a perspective view of the supporting hub of the second preferred embodiment of the control member;

FIG. 12 illustrates a plan view from above of the supporting hub of the second preferred embodiment of the control member;

FIG. 13 illustrates an exploded perspective view of a third preferred embodiment of means for a control member according to this invention;

DETAILED DESCRIPTION OF PREFERRED EMBODIMENTS OF THE INVENTION

Figure 1A:
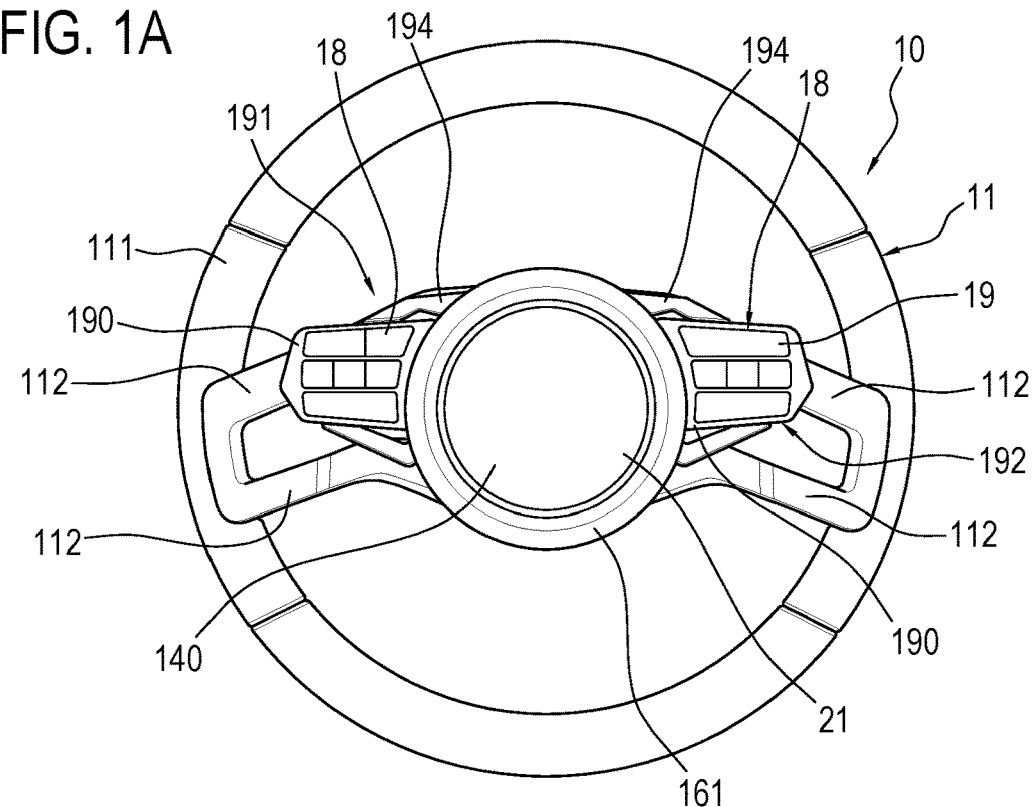
FIGS. 1A and 1B illustrate respective front views of a rotary control member, in different working positions, according to a preferred embodiment of this invention.

With reference to the accompanying drawings, a preferred embodiment of a member 10 for controlling the direction of a vehicle, preferably in the form of a steering wheel for controlling the direction of a nautical vehicle, or boat, comprises a rotatable body 11, which can be manually operated by the skipper of the vehicle for controlling the direction of the vehicle and which is operatively connectable to means defining, or determining, the direction of travel of the vehicle, for example defined by a corresponding blade of the rudder of the boat or other device.

Advantageously, this member 10 for controlling the direction of travel of a vehicle comprises respective means, or hub, 12 for supporting the rotatable body 11, which comprise respective fixed supporting means 14, which are connectable to the fixed structure of the vehicle, and which support, in a rotatable fashion, in particular in a freely rotatable fashion, respective means 16 for supporting, or coupling, the rotatable body 11 which can be operated manually.

Advantageously, the means 14 fixed to the structure of the vehicle support corresponding means 18 which can be used, in particular which can be operated and/or viewed, by the skipper, which remain fixed during the rotations of the rotatable body 11 which can be operated manually.

More specifically, advantageously, as will become clearer as this description continues, the means 18 which can be used by the skipper during the driving of the vehicle comprise, or may comprise, one or more elements, or pushbuttons, 19, which are designed to control the corresponding instruments, apparatuses and/or devices of the vehicle.

Further advantageously, the means which can be used by the skipper pilot from the comprise, or may comprise, a respective display, in particular electronic.

Figure 1B:
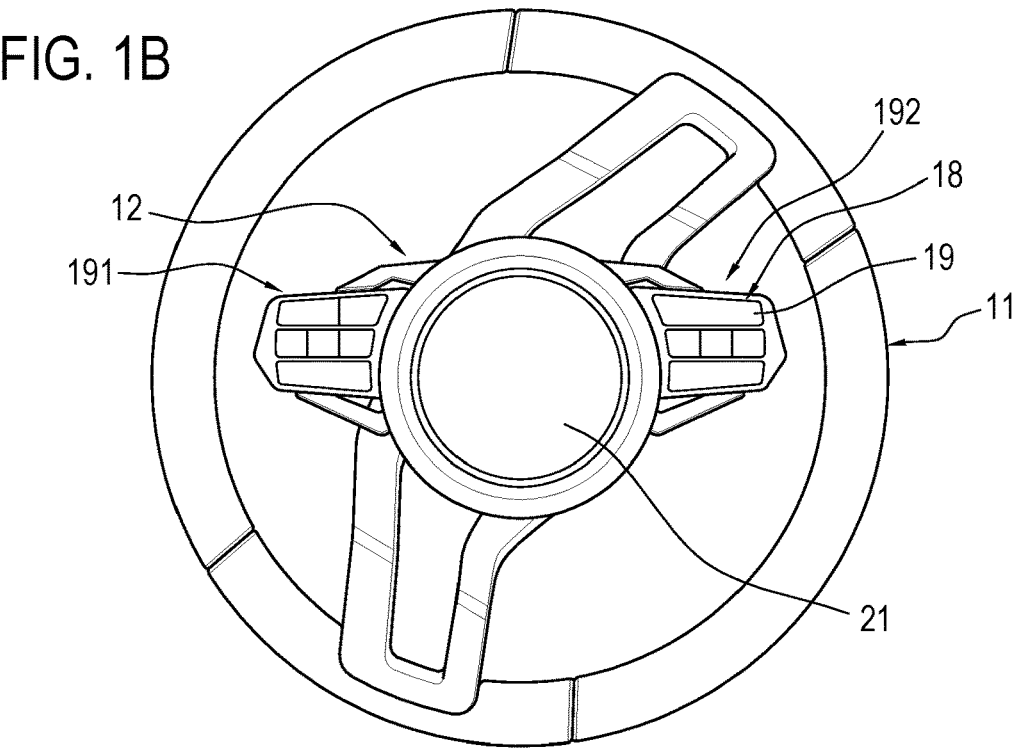
Figure 2:
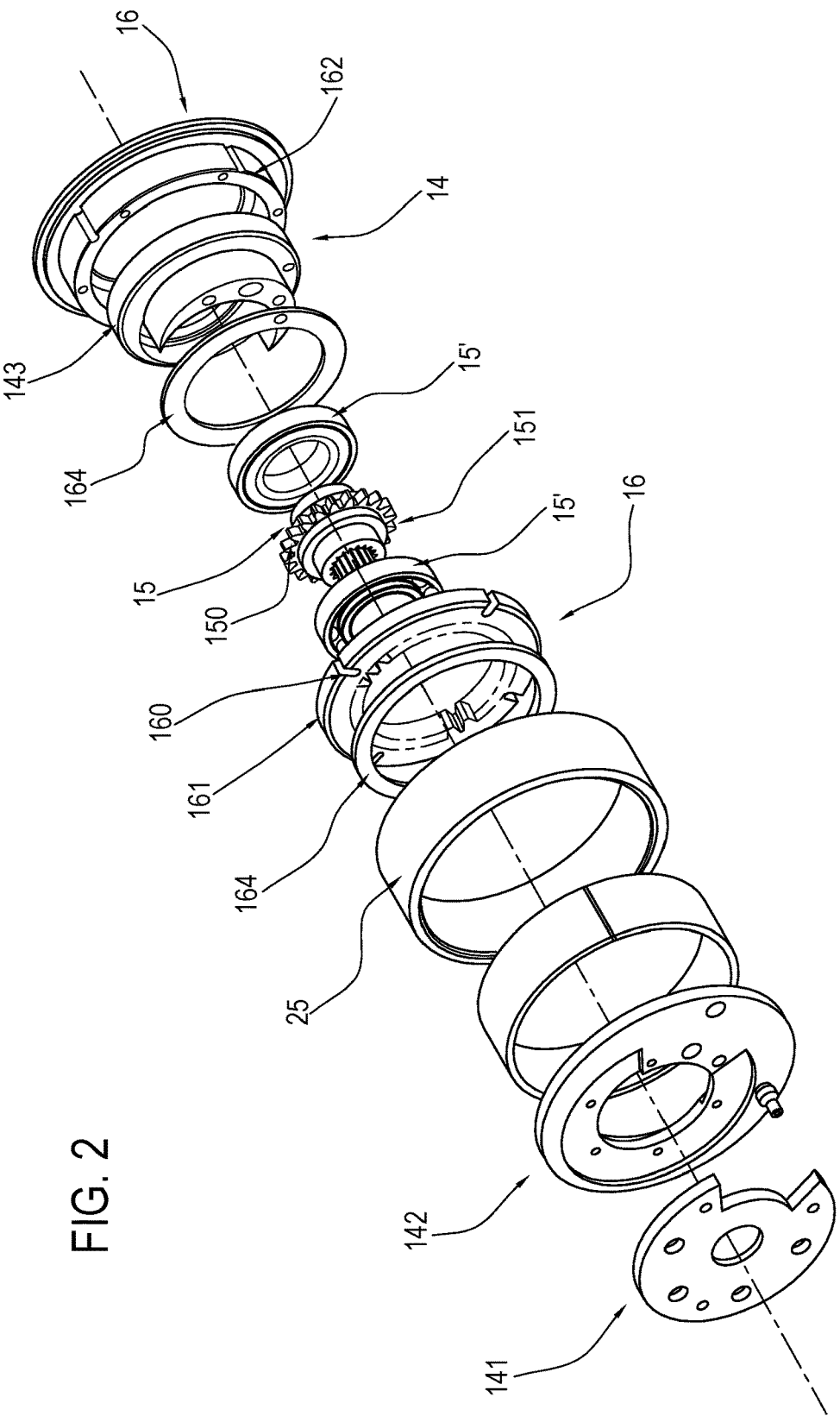
FIG. 2 illustrates an exploded perspective view of the components of the first preferred embodiment of the hub used in the control member according to this invention.
Figure 4:
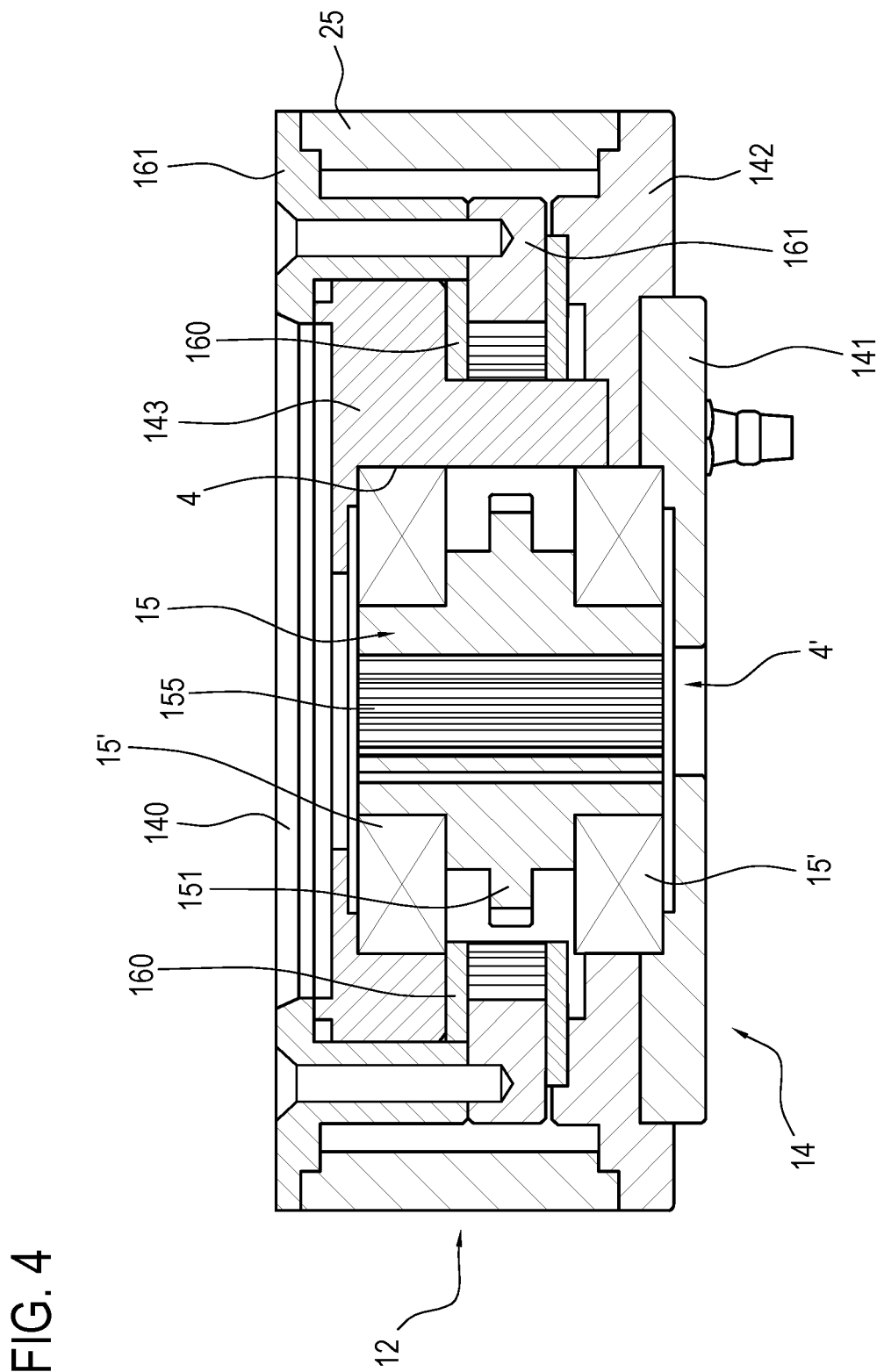
FIG. 4 illustrates a cross section through the line IV-IV of FIG. 3 relative to the first preferred embodiment of the supporting hub.

Also, advantageously, as illustrated in FIGS. 1A and 1B, the means 18 which can be used by the skipper comprise, or may comprise, a respective surface designed to bear a corresponding graphical reproduction, for example reproducing a respective logo 21.

As may be inferred, the means, or hub, 12 house, in a freely rotatable fashion, the corresponding means 15 for transmitting the rotating motion of the rotatable body 11 which can be operated manually towards the means which define, or determine, the direction of travel of the vehicle.

Advantageously, as illustrated, the means, or hub, 12 for supporting the rotatable body 11 which can be operated manually comprise means 150, 160 for multiplying the transmission ratio between the rotatable body 11 and the means 15 for transmitting the rotating motion of the rotatable body 11 which can be operated manually.

Advantageously, the multiplying means comprise a respective drive gear wheel 161 having an inner toothing 160, which is integral with, or integrally connected in a rotary fashion with, supporting, or coupling, means of the rotary body 11.

As illustrated, the drive gear wheel 161 meshes with a corresponding driven gear wheel 151, which is integral, in particular is made as one, with the means 15 for transmitting the motion.

Advantageously, the means for transmitting the motion are in the form of a corresponding longitudinal body 15, which is supported in a freely rotatable manner by the fixed means 14 and which is connectable coaxially to a corresponding spindle, not illustrated in the accompanying drawings, defining part of the chain for driving the means defining, or determining, the direction of travel of the vehicle.

More specifically, the transmission element 15 has, in a central longitudinal position, the toothing, or ring gear, 150 and is supported by corresponding bearings 15', 15', to the longitudinal sides of the toothing 150, the bearings 15', 15' being interposed between the transmission element 15 and the fixed body 14 of the supporting means, or hub, 12.

As illustrated, the means, or hub, 12 are in the form of a squat body having a respective longitudinal axis "L", relative to which the squat body extends circumferentially and which also define the axis of rotation of the rotatable body 11 which can be operated manually, that is, in particular, the supporting or coupling means 16.

As illustrated, the means 15 for transmitting the motion are located in a position which is off centre relative to the longitudinal axis of the means, or hub, 12 for supporting the rotatable body 11 which can be operated manually, being rotatable relative to a respective longitudinal axis which is parallel the main axis "L" and radially spaced relative to it.

Advantageously, the fixed means 14 of the hub comprise base means, or base, 141, 142, for fixing to the structure of the vehicle, for example through corresponding holes for insertion of corresponding connecting screws, which are made in the base and which are labelled in the drawings with reference numeral 1410, 1410.

The base means, or base, 141, 142 define a corresponding cavity 4' for the passage of a corresponding spindle of the drive chain, which is connected integrally to the means 15 of transmitting the angular movement imparted by steering wheel or rotatable body 11 which can be operated manually.

Advantageously, the fixed means 14 also comprise means 143 for supporting the means 18 which can be used by the skipper.

More specifically, as illustrated, the supporting means for the means 18 which can be used by the skipper are in the form of a respective supporting body 143.

As illustrated, the means, or body, 143 for coupling with the means 18 which can be used by the skipper have a corresponding longitudinal cavity 4 for housing the transmission means 15.

As illustrated, the fixed base of the hub comprises, in particular, a longitudinal outer plate 141, for closing the hub body 12, and a plate 142 which is more inside, which is integrally connected, by corresponding screws 1412, to the outer plate 141.

Advantageously, the base means 141, 142 are coupled longitudinally with the means 143 for supporting the means 18 which can be used by the skipper.

More specifically, the fixed base, in particular the inner plate 142 of this, couples longitudinally with the fixed body 143 for coupling with the means 18 which can be used by the skipper, defining, with the fixed body 143, the housing cavity 4 for the transmission means 15, in particular defining overall a corresponding cylindrical surface for engaging the bearings 15' for rotatably supporting the transmission means 15.

More specifically, the base 141, 142 is connected to the body 143 for coupling the means 18 which can be used by the skipper using corresponding integral connecting screws 1413.

Advantageously, thus, the control member 10 comprises means, or hub, 12 for supporting the rotatable body 11 which can be operated manually, in which there are cavity means 014 for the passage of the corresponding connections for the means 18 which can be used by the skipper.

Advantageously, the fixed means 14, in particular the fixed supporting base 141, 142 and/or the body 143 supporting the means 18 which can be used by the skipper, comprise cavity means 014 for the passage of the corresponding connections, preferably electrical, and in particular in the form of respective flexible cables, which connect to the means 18 which can be used by the skipper.

More specifically, the cavity means 014 for the passage of the corresponding electrical connections comprise a respective longitudinal hole 014, which is made in the fixed means 14, in particular in the fixed supporting base 141, 142, and in particular in both the plates defining the fixed supporting base, and/or in the body 143 supporting the means 18 which can be used by the skipper.

Advantageously, the longitudinal hole 014, defining the cavity means for the passage of the corresponding connections, is provided in a position which is off centre relative to the longitudinal axis "L", of the means, or hub, 12 for supporting the rotatable body 11 which can be operated manually.

As illustrated, the hole 014 for the passage of the corresponding connections has a transversal oblong shape, in particular extending along a tangential direction, or at a right angle to the corresponding radius of curvature emanating from the longitudinal axis of the supporting body, or hub, 12.

Advantageously, as illustrated, the fixed means 14, in particular the body 143 for supporting the means 18 which can be used by the skipper, engage and support, at the respective longitudinal end which faces, in use, towards the skipper, or opposite the one engaging the fixed base 141, 142, a fixed end body 140, preferably with a circumferential profile.

The fixed end body 140, if necessary made of plastic material, defines a respective supporting surface for a corresponding graphical reproduction, or logo, 21, or, in a different embodiment, in the form of a corresponding display, in particular electronic, which can be used by the skipper.

As illustrated, the rotatable body 11 which can be operated manually comprises a respective circumferential body 111 and corresponding spoke means 112, in particular in the form of four spokes in pairs respectively side by side, which extend radially relative to the supporting means, or hub, 12 and connecting to the supporting means, or hub, 12, more specifically to the rotatable means 16 for supporting, or coupling, the rotatable body 11 which can be operated manually.

Advantageously, the means 16 for supporting, or coupling, the rotatable body 11 which can be operated manually comprise a respective body 162 for fixing the rotatable body 11 which can be operated manually.

More specifically, as illustrated, the means, or body, 162 for fixing the rotatable body 11 which can be operated manually are in the form of a flanged body 162.

More specifically, the flange 162, for fixing the rotatable body 11 which can be operated manually, is provided at the longitudinal end, which faces in use towards the skipper, and defines a corresponding outer surface, or edge, 161' of the upper face of the supporting means, or hub, 12.

As illustrated, the flange 162 for fixing the rotatable body 11 which can be operated manually is integral, in particular rotatable, with the drive ring gear 161 of the multiplying means.

More specifically, as illustrated, the outer flange 162 is fixed to the drive ring gear 161 by corresponding screws 1621.

In a different embodiment, it is also imaginable that the outer flange 162, for fixing the rotatable body 11, defines, or is as one piece with, the drive ring gear 160 of the means for multiplying, or transmission, of the rotation of the rotatable body 11.

As illustrated, the multiplying ring gear 160, and/or the flange 162 for fixing the rotatable body 11 which can be operated manually, is supported rotatably, by sliding, by the fixed means 14.

More specifically, there are respective sliding annular bodies 164, 164, which are positioned between the fixed means 14 and the body 161 which supports the ring gear 160.

It would also be imaginable to prepare special bearing means between the ring gear 160, and/or the flange 162 for fixing the rotatable body 11 which can be operated manually, and the fixed supporting means 14.

As illustrated, the hub 12 also comprises an outer annular containment wall, which is labelled in the drawings with the reference numeral 25.

As may be inferred from drawings, the transmission means 15 are in the form of a corresponding hollow elongate element, which has an internal groove or toothing 155 for coupling with the spindle of the drive chain, the spindle, however, not being illustrated in the accompanying drawings.

However, it will be understood that the coupling between the transmission means 15 and the spindle of the drive chain might be achieved in any desired manner, for example by corresponding conical surfaces which can be coupled to each other or respective key for fastening during rotation.

Considering now in more detail FIGS. 1A and 1B, it may be inferred that, advantageously, the means 18 which can be used by the skipper are located inside the circumferential body 111 of the rotatable control body 11.

More specifically, advantageously, as illustrated, means 18 which can be used by the skipper extend from the means, or hub, 12 supporting the rotatable body 11.

Advantageously, as illustrated, the 18 which can be used by the skipper, in particular comprising one or more elements, or pushbuttons, 19 for controlling corresponding instruments, apparatuses and/or devices of the vehicle, extend radially to and/or from the means, or hub, 12 supporting the rotatable body 11.

Advantageously, as illustrated, the 18 which can be used by the skipper, in particular comprising one or more elements, or pushbuttons, 19 for controlling corresponding instruments, apparatuses and/or devices of the vehicle, extend laterally from the means, or hub, 12 supporting the rotatable body 11.

Advantageously, as illustrated, the 18 which can be used by the skipper, in particular comprising one or more elements, or pushbuttons, 19 for controlling corresponding instruments, apparatuses and/or devices of the vehicle, extend at sides, in particular transversal opposite the means, or hub, 12 supporting the rotatable body.

Advantageously, there are a first and a second plurality 191, 192 of respective means, or pushbuttons, 19 for controlling corresponding instruments, apparatuses and/or devices of the vehicle.

The first and second plurality 191, 191, of elements, or pushbuttons, 19 for controlling corresponding instruments, apparatuses and/or devices of the vehicle, extend relative to the means, or hub, 12 for supporting the rotatable body, in particular extending radially relative to these, and/or at opposite sides of these, especially being positioned at sides transversally opposite the means, or hub, 12 for supporting the rotating body.

Advantageously, as illustrated, the means 18 which can be used by the skipper, in particular comprising one or more elements, or pushbuttons, 19 for controlling corresponding instruments, apparatuses and/or devices of the vehicle, which are positioned parallel to the plane on which the circumferential body 111 of the rotatable body 11 which can be operated manually lies.

Advantageously, the means 18 which can be used by the skipper, in particular one or more of the elements, or pushbuttons, 19 for controlling corresponding instruments, apparatuses and/or devices of the vehicle, are supported by a corresponding base unit 190, which is, in particular, supported by corresponding arm means, in particular in the form of a first and a second arm 194, 194, which extend from the means, or hub, 12 for supporting the rotary body 11 which can be operated manually.

More specifically, as illustrated, the base 190 supports a plurality of the elements or pushbuttons 19 for controlling corresponding instruments, apparatuses and/or devices of the vehicle, positioned along one or more transversal rows and/or along one or more perpendicular rows. More specifically, as illustrated, there can be three transversal rows of the elements, or pushbuttons, 19 and three perpendicular rows of the elements, or push buttons, 19.

Further advantageously, the means 18 which can be used by the skipper, in particular when they are in the form of a respective display, preferably electronic, and/or a respective surface designed to bear a corresponding graphical reproduction 21, are located at the central steering column zone of the circumferential body 111 of the rotatable body 11.

According to a further advantageous aspect, the means 18 which can be used by the skipper, in particular when they are in the form of a respective display, preferably electronic, and/or a surface designed to bear a corresponding graphical reproduction 21, are located at the upper face of the means, or hub, 12 for supporting the rotatable body 11 which can be operated manually.

In this way, the means which can be used by the skipper are easily accessible or, in any case, can be seen by the skipper.

Thanks to this steering control body 10, or respective hub 12, it is possible to avoid positioning a plurality, or the totality, of elements, or pushbuttons, on the dashboard for controlling corresponding instruments, apparatuses and/or devices of the vehicle and/or the respective control display, in particular electronic. The dashboards can therefore be dimensioned in a more suitable manner or with reduced size, or can be easily used for other functions, above all avoiding the provision on the dashboard of an extremely large number of cables for respective connections, in particular for respective electrical cables.

Figure 8:
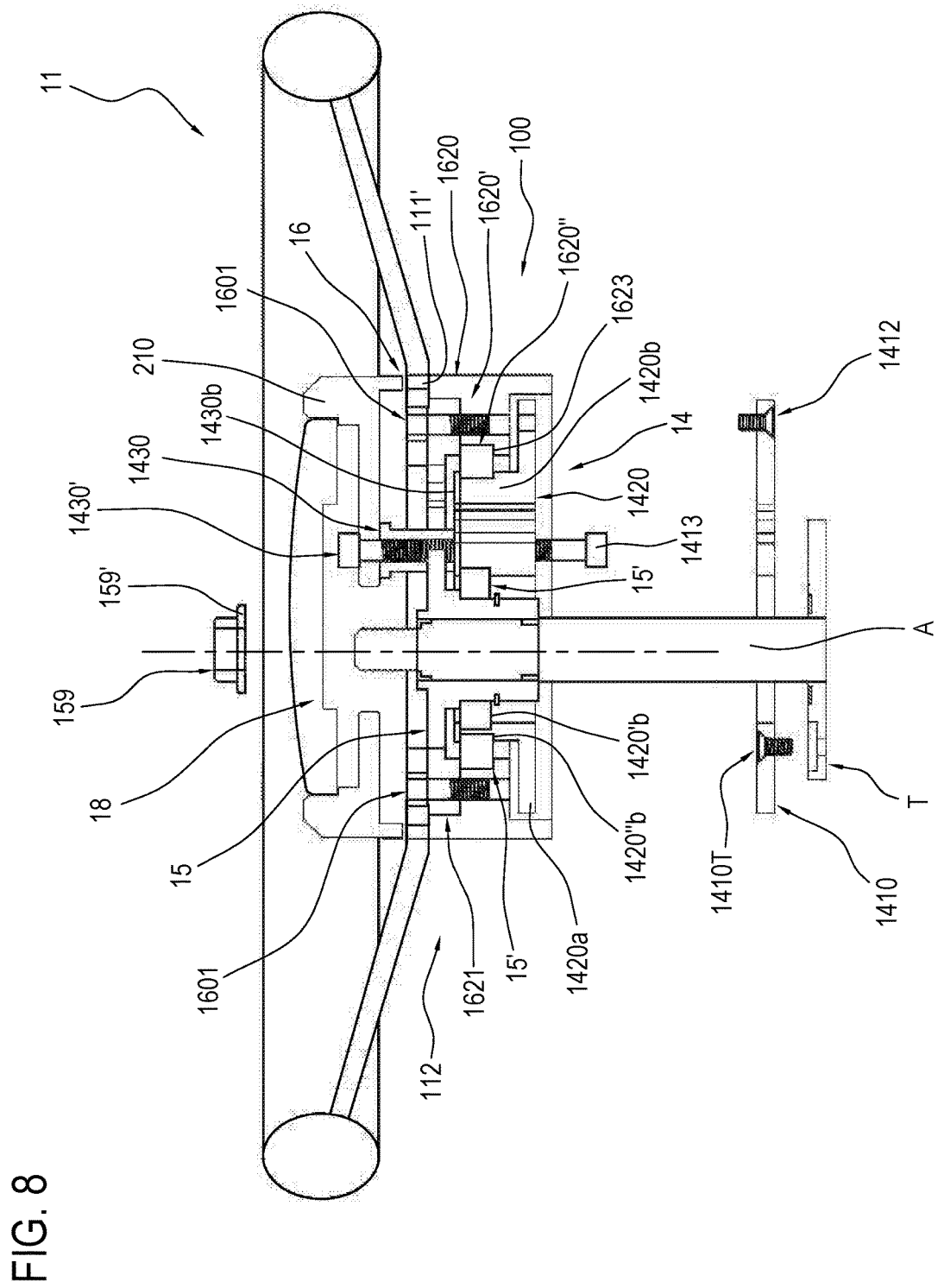
FIG. 8 illustrates a vertical longitudinal section of a second preferred embodiment of the direction control member according to this invention.
Figure 9:
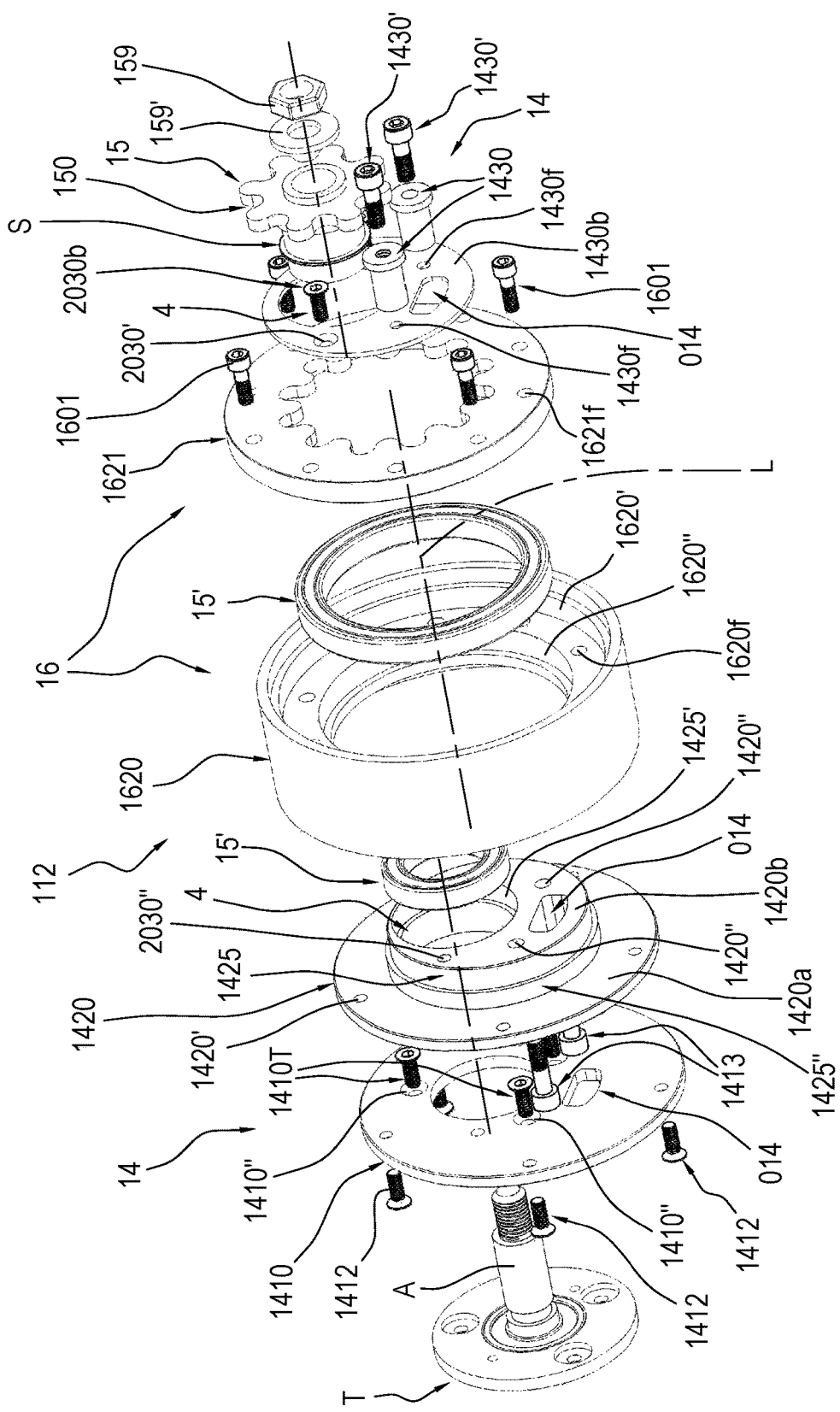
FIG. 9 illustrates an exploded perspective view of a second preferred embodiment of the supporting hub used in the control member of FIG. 8.
Figure 10:
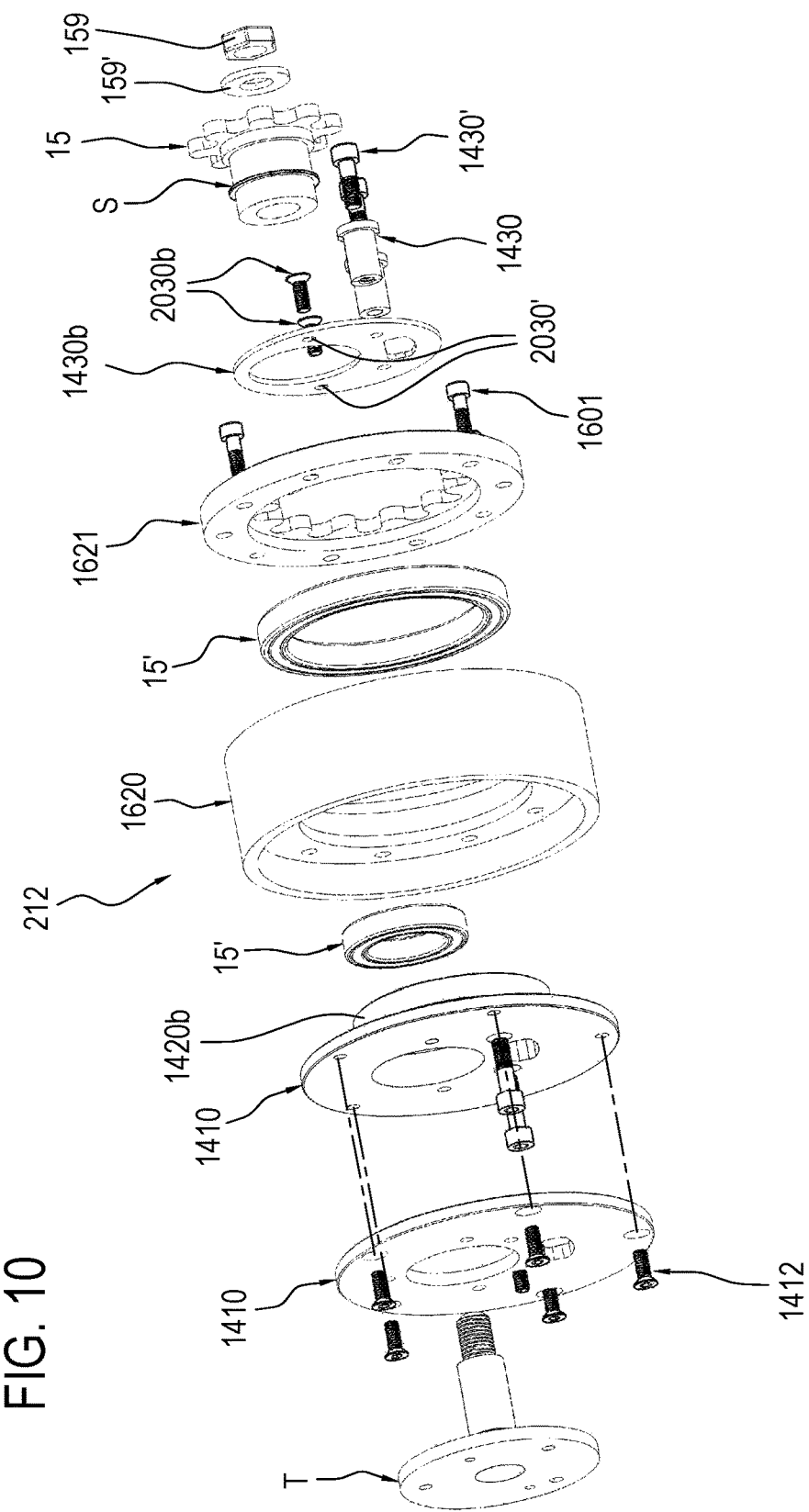
FIG. 10 illustrates an exploded perspective view of the second preferred embodiment of the means, from the side opposite that of the FIG. 9.

A second embodiment of the member 100 for controlling the direction of a vehicle is illustrated in FIGS. 8 and 12, in which the components which are similar or equivalent to those of the first embodiment are denoted by the same reference numerals used in relation to the first preferred embodiment and will not be commented in detail again so as to avoid making this description too lengthy.

As may be inferred from FIGS. 8 to 12, the second preferred embodiment of the member 100 for controlling the direction of a vehicle is, as illustrated, also preferably in the form of a steering wheel for controlling the direction of a nautical vehicle, or boat, and comprises a rotatable body 11, which can be manually operated by the skipper of the vehicle for controlling the direction of the vehicle and which is operatively connectable to means defining, or determining, the direction of travel of the vehicle.

As illustrated, the second preferred embodiment of the member 100 for controlling the direction of a vehicle comprises respective means, or hub, 112 for supporting the rotatable body 11 which can be operated manually, which comprise means 14 fixed to the structure of the vehicle, which rotatably support respective means 16 for supporting, or coupling, the rotatable body 11 which can be operated manually.

Further, as illustrated, this preferred embodiment of the member 100 for controlling the direction of a vehicle also comprises means 14 fixed to the structure of the vehicle which support corresponding means 18 which can be used, in particular which can be operated and/or viewed, by the skipper, the means 18 remaining fixed during the rotations of the rotatable body 11, which are identical to those illustrated in the first preferred embodiment of the member which are therefore not described again in detail.

More specifically, the hub 112 comprises, as illustrated, means for transmitting the motion which are also in the form of a corresponding longitudinal body 15, which is hollow for the passage and the coupling in a rotary fashion of a corresponding spindle A of the system for controlling the means which determine the direction of travel of the vehicle.

In particular, as illustrated, the spindle A protrudes on the side opposite to that of insertion in the longitudinal body 15, that is, above the longitudinal transmission body 15, and has on the respective projecting part of the spindle A a corresponding thread on which is screwed a corresponding securing nut 159, which, using a corresponding washer 159', engages and clamps against the upper surface of the transmission body 15.

Advantageously, the second preferred embodiment comprises fixed means, or base, 14 for fixing to the structure or frame T of the nautical vehicle which comprise first and second base means 1410, 1420, which are made integral with each other, in particular by respective connecting screws 1412, which are inserted into respective holes 1410', 1420' which are provided in the first and second base means 1410, 1420.

More specifically, the base means 1410, 1420 define corresponding rotatable support means for the transmission means 15, as described in more detail below.

Also, as illustrated, the first and second base means 1410, 1420 respectively define means for fixing to the frame T of the nautical vehicle the rotatable supporting means for the means 16 for supporting, or coupling, the rotatable body 11 which can be operated manually and fixed supporting means of the corresponding means 18 which can be used, in particular which can be operated and/or viewed, by the skipper.

More specifically, as illustrated, the first base means are defined by a respective body 1410, which is in particular in the form of a flanged body, preferably flat, or flattened, for coupling, thanks to corresponding screws 1410T which are inserted in corresponding holes 1410" of the body 1410, to the frame T of the nautical vehicle.

Moreover, the second base means are defined by a respective body 1420, in particular in the form of a corresponding flanged body 1420a, from which extends axially a respective hollow sleeve and with a variable radial thickness, in particular with an asymmetrical radial thickness, 1420b, which has an internal axial cavity 4', which is delimited by a respective inner surface, especially cylindrical, 1425' on which are supported corresponding bearing means 15' for the transmission means 15 and an outer profile 1425" for supporting corresponding bearing means 15' for rotatably supporting means 16 for supporting, or coupling, the rotatable body 11 which can be operated manually.

However, it will be understood that, according to a further preferred embodiment not illustrated in the accompanying drawings, it would also be imaginable that the first and second base body 1410, 1420 can be replaced by a respective single and compact base body.

Advantageously, also in this second preferred embodiment, the base means 1410, 1420 are coupled longitudinally with the means 1430 for supporting the means 18 which can be used by the skipper.

Advantageously, the second base means, or body, 1420 have corresponding hole means, in particular defined by a first and a second hole 1420', 1420', preferably extending inside the sleeve portion 1420*b* of these, the hole means being provided for insertion of corresponding screw means, in particular in the form of a first and a second screw, 1413, 1413 for retaining means, in particular bushing means, 1430, 1430 for fixed support of corresponding means 18 which can be used by the skipper, which are described in more detail below.

Advantageously, in this second preferred embodiment of the member, or hub, 100, the means 14 for supporting the means 18 which can be used by the skipper are in the form of respective bushing means, and in particular in the form of a first and a second bushing 1430, 1430, which are axially hollow and threaded inside in order to receive respective screw means for fixing a corresponding circumferential body 210 which, in turn, defines a respective inner seat for housing the means 18 which can be used by the skipper. As illustrated, the bushes 1430, 1430 extend axially, parallel with each other, and are positioned on a corresponding transversal side of the transmission means 15.

As illustrated, advantageously, the fixed supporting means 14 of the means 18 which can be used by the skipper also comprise a disc-shaped body, preferably flat, or flattened, 1430*b* for engaging the respective end, in particular a lower end, of the bushing means 1430, 1430, which, in particular, engage on the corresponding body or sleeve 1420*b* of the second base means, 1420, and which, at the zone for engaging the bushing means 1430, 1430 has corresponding hole means 1430*f* for the passage of the screw means 1413 for retaining the bushing means 1430 on the base, or respective body, means 1420.

Advantageously, as illustrated, the disc-shaped body 1430*b* for engaging the respective end of the bushing means 1430, 1430 has a corresponding longitudinal cavity 4 for housing the transmission means.

Advantageously, the disc-shaped body 1430*b* for engaging the respective end of the bushing means 1430, 1430 has corresponding holes 2030' for inserting respective screws 2030*b* inserted in corresponding holes 2030" of the asymmetrical sleeve 1420*b*, to which the disc-shaped body 1430*b* is fixed.

In practice, the disc-shaped body 1430*b* for engaging the respective end of the bushing means 1430, 1430 is fixed to the base means, or upper body of these, 1420.

In this second preferred embodiment of the member or hub 100, the means 16 for supporting, or coupling, the rotatable body 11 which can be operated manually, advantageously, comprise a tubular body, in particular on the outside, 1620 for fixing the rotatable body 11 which can be operated manually, that is to say, a circumferential central portion of the hub 111' of this, the fixing being performed, in particular, by respective screws 1601 inserted in corresponding holes 1620*f* provided in the tubular body and in the flanged body 1621 which supports the multiplying ring gear 161, as will be described in detail below.

More specifically, as illustrated, advantageously, the tubular body, in particular external, 1620 supports a corresponding flanged body 1621, which defines, or carries, the multiplying gear wheel 161.

In particular, as illustrated, the flanged body 1621 which defines the multiplying ring gear 161 is fixed to the tubular body 1620 by corresponding screws 1601, which are inserted in respective holes 1620*f*, 1621*f* provided, respectively, in the outer tubular body 1620 and in the flanged body 1621 which defines, or carries, the ring gear 161.

As illustrated, advantageously, the outer tubular body 1620 has an annular inner, or internally protruding, portion 1620' of reduced height relative to the outer tubular element, the inner annular portion 1620' defining a transversal surface, extending circumferentially, for supporting the flanged body 1621 defining, or carrying, the multiplying ring gear 161.

Further, the tubular body 1620 also has a cylindrical inner surface 1620" of the annular inner portion 1620', the inner cylindrical surface engaging outside respective bearing means 15' for rotatably supporting the rotatable control body 11. As illustrated, the inner cylindrical surface 1620" of the tubular body 1620 has a respective annular shoulder 1625 for axially positioning and retaining the bearing means 15'.

More specifically, as illustrated, the disc-shaped body 1430*b*, on which the bushing means 1430, rest is positioned, axially, below relative to the flanged body 1621 which defines, or carries, the multiplying ring gear 161 meshing with the corresponding gear ring of the transmission means 15.

Advantageously, as illustrated, the bushing means 1430 for coupling the rotatable body 11 which can be operated manually extend axially passing through the flanged body 1621 which defines, or carries, the multiplying ring gear 161.

Advantageously, as illustrated, the asymmetrical sleeve 1420*b* of the respective base means, or body, 1420 has a corresponding external annular shoulder 1420'*b* for positioning the corresponding bearing means 15' for the means 16 for supporting and coupling the rotatable body 11 which can be operated manually and, also, a corresponding internal annular shoulder 1420"*b* for positioning the corresponding bearing means 15' for the transmission means 15.

As illustrated, on the outer surface of the cylindrical body defining the transmission means 15 and below the ring gear 151 of these, there may be a corresponding Seeger type stop ring denoted by the reference S in the drawings.

Advantageously, also in this second preferred embodiment of the member 100, there are cavity means 014 for the passage of the corresponding connections, in particular electric, of the means 18 which can be used by the skipper, the cavity means 014 comprising a respective longitudinal hole 014 which is made in the fixed means 14, in particular in the fixed supporting means, or respective body, 1410 and/or 1420, in particular the longitudinal hole 014 extending in the corresponding asymmetrical sleeve 1420*b* of the corresponding base body at the portion of greater radial thickness of this.

Moreover, the cavity means 014 for the passage of the corresponding connections, in particular electric, of the means 18 which can be used by the skipper, comprise a respective longitudinal hole 014 which extends in, or passes longitudinally through, the disc-shaped body 1430*b* for supporting the bushing means 1430 for supporting and coupling the means 18 which can be used by the skipper.

In practice, in this second embodiment of the member 100, or hub 112, that is, in the corresponding means or bodies in which the cavity means 014 are provided, the latter are also provided in a position which is off centre relative to the longitudinal axis of the respective means or bodies or, overall, of the hub 112.

Figure 14:
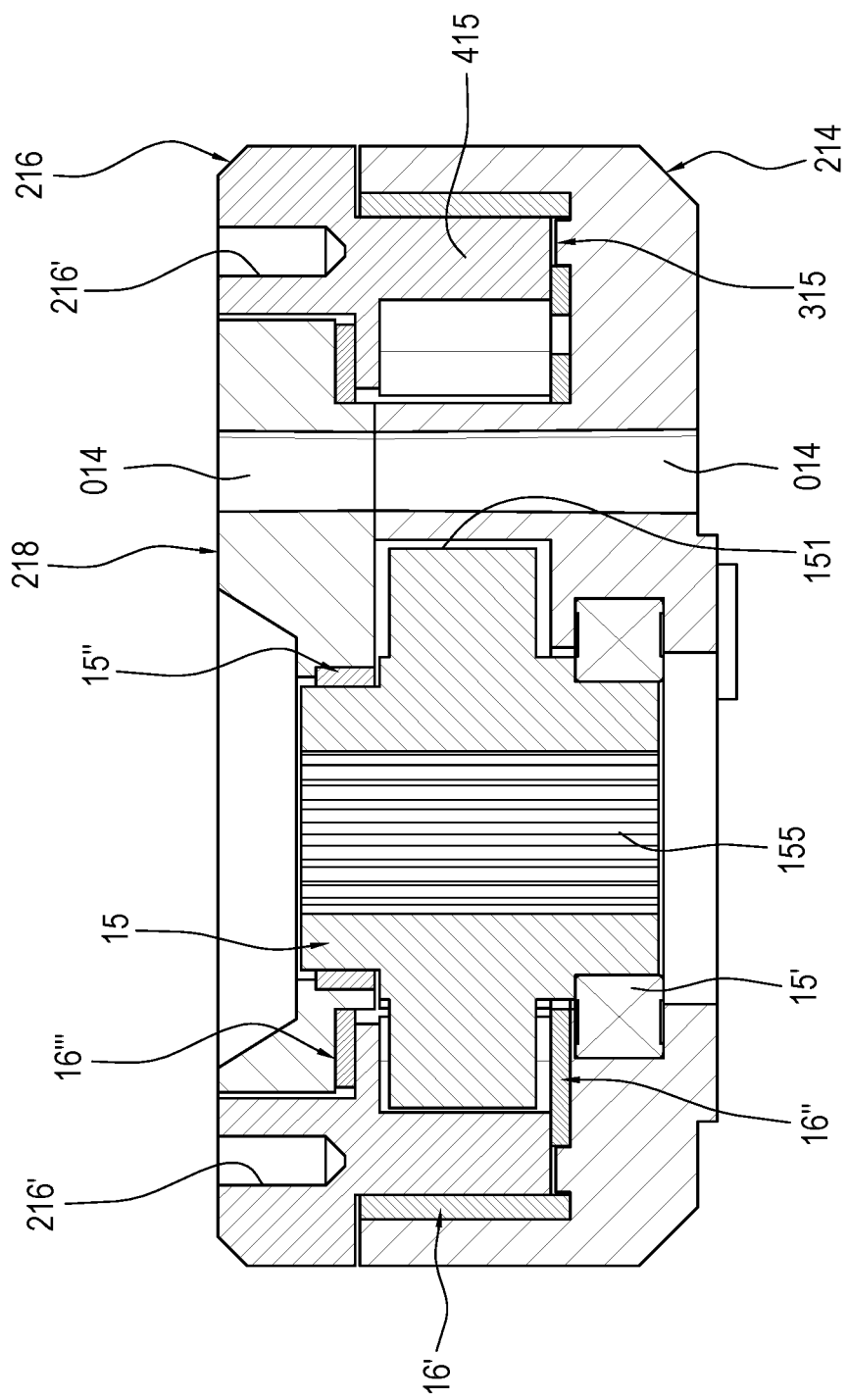
FIG. 14 illustrates a longitudinal section of the third preferred embodiment of the means for a control member according to this invention.

FIGS. 13 and 14 illustrate a third preferred embodiment of the member for controlling the direction of travel of a vehicle, and in particular the corresponding hub 212 of this.

In FIGS. 13 and 14, the components which are similar to those of the first and second embodiments are denoted by the same reference numerals and will not be commented in detail again so as to avoid making this description too lengthy.

As may be inferred from FIGS. 13 to 14, the third preferred embodiment of the member for controlling the direction of a vehicle also comprises, not particularly illustrated in the accompanying drawings, a steering wheel for controlling the direction of a nautical vehicle, or boat, which comprises a respective rotatable body, which can be manually operated by the skipper of the vehicle for controlling the direction of the vehicle and which is operatively connectable to means defining, or determining, the direction of travel of the vehicle.

As illustrated, the third preferred embodiment of the member for controlling the direction of a vehicle also comprises respective means, or hub, 212 for supporting the rotatable body which can be operated manually, which comprise means 214 fixed to the structure of the vehicle, which rotatably support respective means 216 for supporting, or coupling, the rotatable body which can be operated manually.

Further, as illustrated, this preferred third embodiment of the member for controlling the direction of a vehicle also comprises means 214 fixed to the structure of the vehicle which support corresponding means 218 supporting corresponding means which can be used, in particular which can be operated and/or viewed, by the skipper, which remain fixed during the rotations of the rotatable body, in a similar fashion to that described previously with regard to the first and second preferred embodiments.

More specifically, the hub 212 comprises, as illustrated, means for transmitting the motion which are also in the form of a corresponding longitudinal body 15, which is hollow for the passage and the coupling in a rotary fashion of a corresponding spindle (not illustrated in FIGS. 13 and 14), of the system for controlling the means which determine the direction of travel of the vehicle, and in any case in a similar fashion to that described previously with regard to the first and second preferred embodiments.

Advantageously, the third preferred embodiment comprises fixed means or base 214 for fixing to the structure or frame of the vehicle nautical which define corresponding rotatable support means for the transmission means 15, as described in more detail below.

In practice, as illustrated, the fixed means, or base, 214 define means for fixing to the frame of the nautical vehicle the rotatable supporting means for the means 216 for supporting, or coupling, the rotatable body which can be operated manually and fixed supporting means of the corresponding means 218 supporting the means which can be used, in particular which can be operated and/or viewed, by the skipper.

More specifically, as illustrated, the base means. 214 comprise a respective disc-shaped body 214', from which extends axially a respective protrusion 215, in particular arc shaped and of variable radial thickness, the disc-shaped body 214' having a cavity 4' open axially, which is delimited by a respective inner surface, especially cylindrical, 215', on which are supported corresponding bearing means 15' for the transmission means 15.

As illustrated, the transmission means 15 are also in the form of a corresponding hollow elongate element, which has an internal toothing 155 for coupling with the spindle of the drive chain, the spindle, however, not being illustrated in the accompanying drawings.

As illustrated, a ring gear 151 is also supported or made outside the elongate member 15 for meshing with a respective drive gear wheel 161 for defining corresponding means for multiplying the transmission ratio between the rotatable body and the transmission means 15.

As illustrated, the cavity 4' is positioned off-centre relative to the centre of the base body 214.

As illustrated, the protrusion 215' has respective means 014 for the passage of the corresponding connections for the means which can be used by the skipper, the means for passage 014 extending in the disc-shaped base body 214'.

Advantageously, the means for the passage of the corresponding connections, preferably electrical, and in particular in the form of respective flexible cables, which connect to the means which can be used by the skipper, are in the form of a corresponding longitudinal hole 014 axially open, which, preferably, opens at the zone of greatest thickness of the axial protrusion 215.

Also in this third preferred embodiment, the hole or opening 014 for the passage of the corresponding connections for the means which can be used by the skipper has a transversal oblong shape, in particular extending along a tangential direction, or at a right angle to the corresponding radius of curvature emanating from the respective longitudinal axis of the supporting body, or hub, 212.

As illustrated, the short axial protrusion 215 has an arc shape and extends for a certain circumferential stretch around the opening 4' provided in the disc-shaped body 214'.

Advantageously, in the third preferred embodiment, from the base body 214 extends a respective outer annular containment wall, which is denoted in the drawings with the reference numeral 225, and which is radially spaced from the axial protrusion 215.

As illustrated, the outer containment wall 225 extends axially beyond the free end of the axial protrusion 215.

The axial protrusion 215 also comprises corresponding hole means 249, in particular in the form of a first and a second hole provided at the sides of the opening 014 for the passage of the corresponding connection cables, in which are screwed corresponding means, in particular screws 248, 248, for coupling the base body 214, of the means 218 which support the means which can be used by the skipper.

In practice, advantageously, in the third preferred embodiment, the base means 214 are coupled longitudinally and directly with the means 218 supporting the means which can be used by the skipper.

Advantageously, in the third preferred embodiment, the means 218 supporting the means which can be used by the skipper are in the form of a disc-shaped body, preferably flat, or flattened, having corresponding hole means 219, 219 for the passage of the screw means 248, 248 for retaining the means 218 supporting the means which can be used by the skipper to the fixed supporting means 214.

As illustrated, the disc-shaped body 218 has a respective cavity 4' open axially, which is delimited by a respective inner surface, in particular cylindrical, 215' on which a corresponding cylindrical sliding body 15" is supported for the other end of the transmission means 15. However, it will be understood that the other ends of the transmission means 15 might also be supported rotatably, rather than by the bearing 15', by a corresponding cylindrical sliding body, similar to the cylindrical sliding body 15".

As illustrated, the cavity 4' in this disc-shaped body 218 is also positioned off-centre, relative to the centre of the hub 212.

Moreover, in this disc-shaped body 218 there are respective means 014 for the passage of the corresponding connections for the means which can be used by the skipper, which connect to the means which can be used by the skipper and which are in the form of a corresponding longitudinal hole 014 axially open, which, preferably, has a transversal oblong shape, in particular extending along a tangential direction, or at a right angle to the corresponding radius of curvature emanating from the respective longitudinal axis of the supporting body, or hub, 212.

In this third preferred embodiment of the member, or hub, the means 216 for supporting, or coupling, the rotatable body which can be operated manually advantageously comprise a flanged body 2160 having corresponding holes 216' for coupling the rotatable body, or steering wheel, which can be operated manually, a corresponding sleeve, or cylindrical element, 2161 extending from the flanged body, having an internal cavity in which an internal toothing 160 is made, defining a respective conductor gear wheel, meshed with a corresponding driven gear wheel 151, which is integral, in particular is made as one, with the motion transmission means 15.

The means 216 for supporting, or coupling, the rotatable body which can be operated manually are supported in a slidable or rotatable manner by the base means, thanks to a corresponding cylindrical sliding body 16', which is interposed between the outer wall of the sleeve 2161, defining the inner toothing 160, and the inner surface of the containment wall 225 of the base body 214.

Moreover, corresponding flattened annular sliding bodies 16" and 16'" are interposed between corresponding transversal surfaces of the means 216 for supporting and coupling the rotatable body which can be operated manually and opposite transversal surfaces, respectively, of the base body 214 and the means 218 supporting the means which can be used by the skipper.

Advantageously, as illustrated, the cavity means 014 for the passage of the corresponding connections, in particular electrical, for connecting the means 218 for supporting the means which can be used by the skipper and the cavity means 014 provided in the base body 214 are aligned with each other and each provided on the direct extension of the others.

Figure 15:
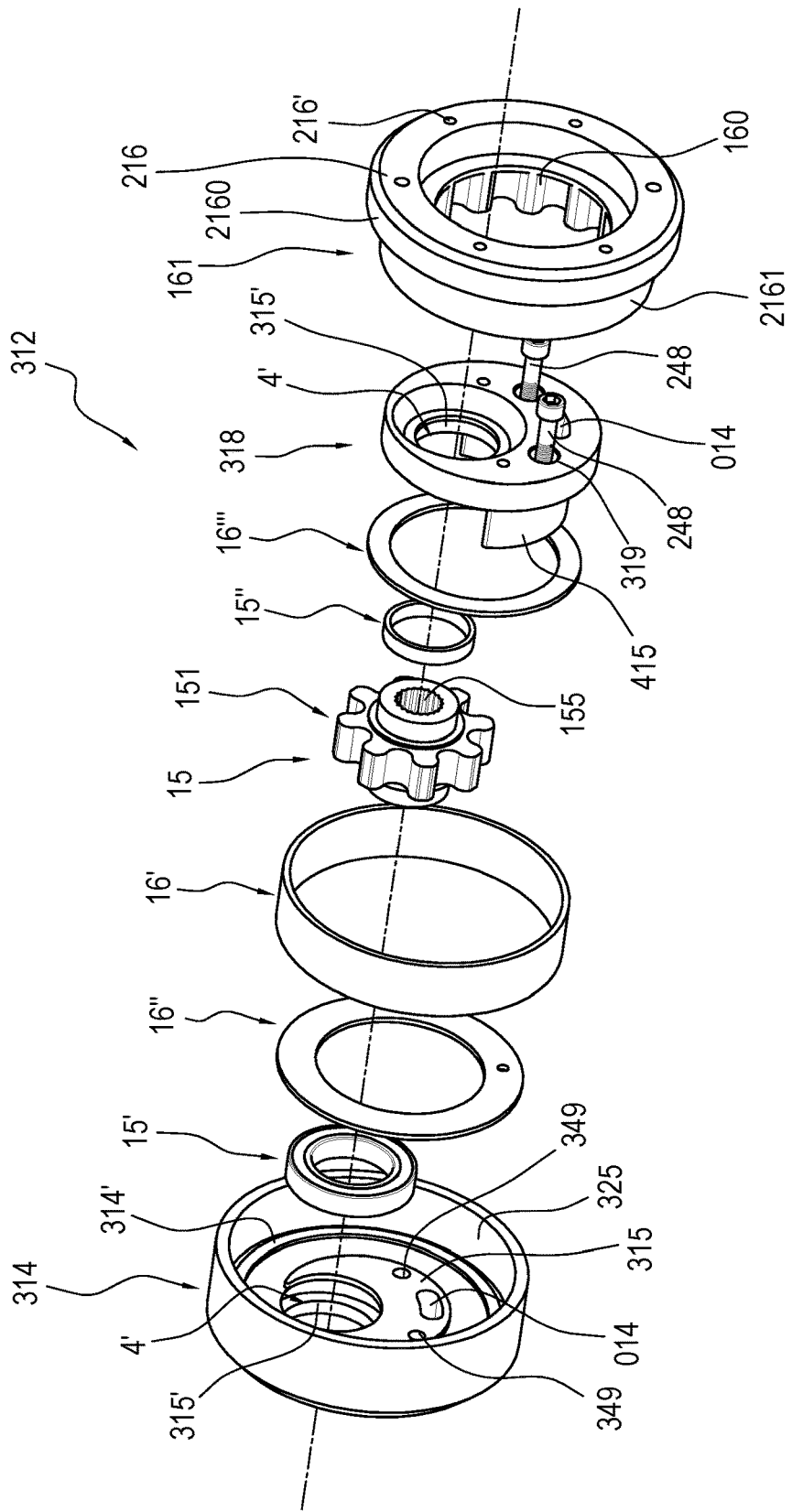
FIG. 15 illustrates an exploded perspective view of a fourth preferred embodiment of means for a control member according to this invention.
Figure 16:
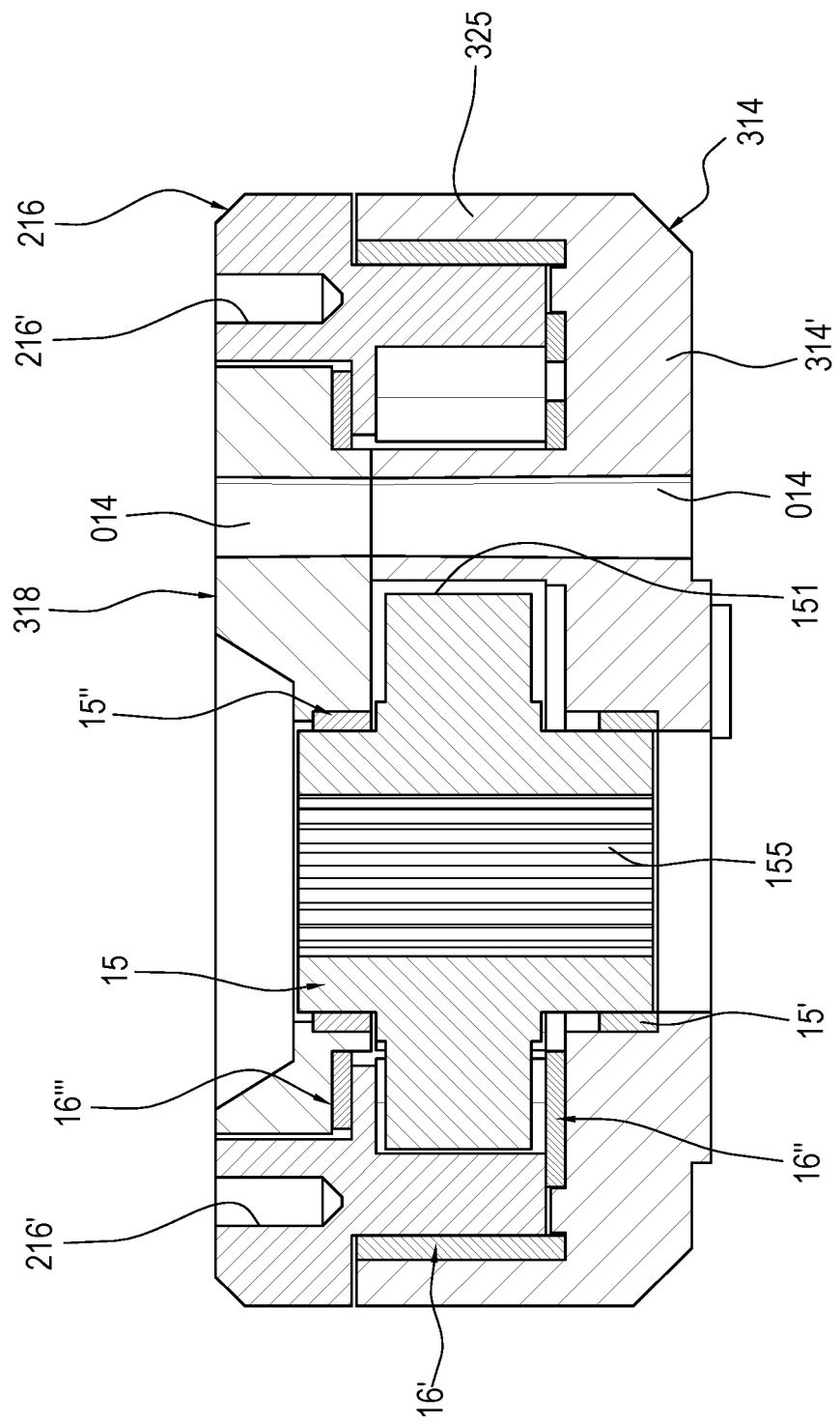
FIG. 16 illustrates a longitudinal section of the fourth preferred embodiment of a hub for a control member according to this invention.

FIGS. 15 and 16 illustrate a third preferred embodiment of the member for controlling the direction of travel of a vehicle, in particular the corresponding hub 312 of this.

In FIGS. 15 and 16, the components which are similar to those of the previous embodiments, and in particular to the third preferred embodiment, are denoted by the same reference numerals and will not be commented in detail again so as to avoid making this description too lengthy.

As may be inferred from FIGS. 15 to 16, the fourth preferred embodiment of the member for controlling the direction of a vehicle also comprises, not particularly illustrated in the accompanying drawings, a steering wheel for controlling the direction of a nautical vehicle, or boat, which comprises a respective rotatable body, which can be manually operated by the skipper of the vehicle for controlling the direction of the vehicle and which is operatively connectable to means defining, or determining, the direction of travel of the vehicle.

As illustrated, the fourth preferred embodiment of the member for controlling the direction of a vehicle also comprises respective means, or hub, 312 for supporting the rotatable body which can be operated manually, which comprise means 314 fixed to the structure of the vehicle, which rotatably support respective means 216 for supporting, or coupling, the rotatable body which can be operated manually.

Further, as illustrated, this preferred fourth embodiment of the member for controlling the direction of a vehicle also comprises means 314 fixed to the structure of the vehicle which support corresponding means 318 supporting corresponding means which can be used, in particular which can be operated and/or viewed, by the skipper, which remain fixed during the rotations of the rotatable body, in a similar fashion to that described previously with regard to the previous preferred embodiments.

More specifically, the hub 212 comprises, as illustrated, means for transmitting the motion which are also in the form of a corresponding longitudinal body 15, which is hollow for the passage and the coupling in a rotary fashion of a corresponding spindle (not illustrated in FIGS. 15 and 16), of the system for controlling the means which determine the direction of travel of the vehicle, and in any case in a similar fashion to that described previously with regard to the first and second preferred embodiments.

Advantageously, the fourth preferred embodiment comprises fixed means or base 314 for fixing to the structure or frame of the vehicle nautical and which define corresponding rotatable support means for the transmission means 15, as described in more detail below.

In practice, as illustrated, the fixed means, or base, 314 define means for fixing to the frame of the nautical vehicle the rotatable supporting means for the means 216 for supporting, or coupling, the rotatable body which can be operated manually and fixed supporting means of the corresponding means 318 supporting the means which can be used, in particular which can be operated and/or viewed, by the skipper.

More specifically, as illustrated, the base means 314 comprise a respective disc-shaped body 314', from which extends axially a respective short protrusion 315, in particular arc shaped and of variable radial thickness, the disc-shaped body 314' having a cavity 4' open axially, which is delimited by a respective inner surface, especially cylindrical, 315', on which are supported corresponding sliding means 15' for the transmission means 15, in particular in the form of a corresponding cylindrical annular sliding body 15'. It will be understood, however, that instead of the annular sliding body 15' it would also be possible to use corresponding bearing means, in the same way as illustrated in relation to the third preferred embodiment described above.

As illustrated, the transmission means 15 are also in the form of a corresponding hollow elongate element, which has an internal toothing 155 for coupling with the spindle of the drive chain, the spindle, however, not being illustrated in the accompanying drawings.

As illustrated, a ring gear 151 is also supported or made outside the elongate member 15 for meshing with a respective drive gear wheel 161 for defining corresponding means for multiplying the transmission ratio between the rotatable body and the transmission means 15.

As illustrated, the cavity 4' provided in the base body 314 is positioned off-centre relative to the centre of the base body 314.

As illustrated, the short protrusion 315' defines respective means 014 for the passage of the corresponding connections for the means which can be used by the skipper, the means for passage 014 extending in the disc-shaped base body 314'.

Advantageously, the means for the passage of the corresponding connections, preferably electrical, and in particular in the form of respective flexible cables, which connect to the means which can be used by the skipper, are in the form of a corresponding longitudinal hole 014 axially open, which, preferably, opens at the zone of greatest thickness of the short axial protrusion 315.

Also in this fourth preferred embodiment, the hole or opening 014 for the passage of the corresponding connections for the means which can be used by the skipper has a transversal oblong shape, in particular extending along a tangential direction, or at a right angle to the corresponding radius of curvature emanating from the respective longitudinal axis of the supporting body, or hub, 312.

As illustrated, the short axial protrusion 315 has an arc shape and extends for a certain circumferential stretch around the opening 4' provided in the disc-shaped body 314'.

Advantageously, also in the fourth preferred embodiment, from the base body 314 extends a respective outer annular containment wall, which is denoted in the drawings with the reference numeral 325, and which is radially spaced from the axial protrusion 315.

As illustrated, the outer containment wall 325 extends axially well beyond the free end of the axial protrusion 315.

The axial protrusion 315 also comprises corresponding hole means 349, in particular in the form of a first and a second hole provided at the sides of the opening 014 for the passage of the corresponding connection cables, in which are screwed corresponding means, in particular screws 248, 248, for coupling the base body 248, of the means 318 which support the means which can be used by the skipper.

In practice, advantageously, in the fourth preferred embodiment, the base means 314 are coupled longitudinally and directly with the means 318 supporting the means which can be used by the skipper.

Advantageously, in the fourth preferred embodiment, the means 318 supporting the means which can be used by the skipper are in the form of a disc-shaped body, preferably flat, or flattened, having corresponding hole means 319 for the passage of the screw means 248, 248 for retaining the means 318 supporting the means which can be used by the skipper to the fixed supporting means 314.

As illustrated, the disc-shaped body 318 has a respective cavity 4' open axially, which is delimited by a respective inner surface, in particular cylindrical, 315' on which a corresponding cylindrical annular sliding body 15" is supported for the other end of the transmission means 15.

As illustrated, the cavity 4' in this disc-shaped body 318 is also positioned off-centre, in particular relative to the centre of the hub 312.

Moreover, unlike the third preferred embodiment, the means 318 supporting the means which can be used by the skipper have a corresponding axial protrusion 415, in particular arc shaped and with a variable radial thickness, which extends from the disc-shaped body 318.

More specifically, the axial protrusion 415 has a shape which is specular or coincident with that of the short axial protrusion 315 which is provided on the base body 314 with which it touches, as illustrated in FIG. 16.

For this reason, the axial protrusion 415 has an arc shape and extends for a certain circumferential stretch around the opening 4' provided in the disc-shaped body 318.

Moreover, in this disc-shaped body 318 there are respective means 014 for the passage of the corresponding connections for the means which can be used by the skipper, which connect to the means which can be used by the skipper and which are in the form of a corresponding longitudinal hole 014 axially open, which, preferably, has a transversal oblong shape, in particular extending along a tangential direction, or at a right angle to the corresponding radius of curvature emanating from the respective longitudinal axis of the supporting body, or hub, 212.

More specifically, the longitudinal hole 014 extends in the zone of greatest thickness of the short axial protrusion 415.

In this fourth preferred embodiment of the member, or hub, the means 216 for supporting, or coupling, the rotatable body which can be operated manually, are the same as those of the third preferred embodiment and advantageously comprise a flanged body 2160 having corresponding holes 216' for coupling the rotatable body, or steering wheel, which can be operated manually, a corresponding sleeve, or cylindrical element, 2161 extending from the flanged body, having an internal cavity in which an internal toothing 160 is made, defining a respective conductor gear wheel, meshed with a corresponding driven gear wheel 151, which is integral, in particular is made as one, with the motion transmission means 15.

The means 216 for supporting, or coupling, the rotatable body which can be operated manually are supported in a slidable or rotatable manner by the base means, thanks to a corresponding cylindrical annular sliding body 16', which is interposed between the outer wall of the sleeve 2161, defining the inner toothing 160, and the inner surface of the containment wall 325 of the base body 314.

Moreover, corresponding flattened annular sliding bodies 16" and 16''' are interposed between corresponding transversal surfaces of the means 216 for supporting and coupling the rotatable body which can be operated manually and opposite transversal surfaces, respectively, of the base body 114 and the means 318 supporting the means which can be used by the skipper.

Advantageously, as illustrated, the cavity means 014 for the passage of the corresponding connections, in particular electrical, for connecting the means 318 for supporting the means which can be used by the skipper and the cavity means 014 provided in the base body 314 are aligned with each other and each provided on the direct extension of the others.

As is evident, the respective hub 12, 112, 212, 312 of the above-mentioned preferred embodiments is in the form of a particularly compact body, in particular longitudinally, which allows the member for controlling the direction of travel to be applied on vehicles already configured without modifying the steering arrangement and/or the appearance of the vehicle.

Moreover, as may be inferred from the drawings, the hub 12, 112, 212, 312 can be inserted, in an off centre or offset manner on a corresponding spindle for transmission of the chain controlling the means for steering the nautical vehicle.

The invention described has evident industrial applications. It would be obvious to one skilled in the art that several changes and modifications can be made to the invention without departing from the spirit and scope of the invention, described in depth above. More specifically, one skilled in the art could easily imagine further embodiments of the invention comprising one or more of the features described herein. It will also be understood that all the details of the invention may be substituted by technically equivalent elements.

The invention claimed is:

1. A control member that controls a direction of a nautical vehicle having a rotatable body that is manually operated by a skipper of the vehicle to control the direction of the vehicle and is operatively connectable to means for determining the direction of travel of the vehicle, the control member comprising:

a hub, that supports the rotatable body, the hub including fixed supporting means fixed to a structure of the vehicle, and the hub also rotatably connected to coupling means that couple with the rotatable body, wherein the fixed supporting means support fixed operable means operable by the skipper during a driving of the vehicle, said fixed operable means configured to remain fixed during a rotation of the rotatable body, wherein the hub also includes means for transmitting a rotating motion of the rotatable body to the means for determining the direction of travel of the vehicle, wherein the hub further includes means for multiplying a transmission ratio between the rotatable body and the means for transmitting the rotating motion, wherein the means for multiplying the transmission ratio comprise a drive gear wheel integral with said coupling means that couple with the rotatable body, wherein the means for multiplying the transmission ratio further comprise a driven gear wheel, the driven gear wheel being integral with and made as one with the means for transmitting the rotating motion, wherein the drive gear wheel has an inner toothing, which meshes with corresponding teeth of the driven gear wheel, wherein the means for transmitting the rotating motion are in the form of a longitudinal body supported in a freely rotatable manner by the fixed supporting means, and wherein the longitudinal body is connectable coaxially to a corresponding spindle of the means for determining the direction of travel of the vehicle.

* * * * *